United States Patent
Oida et al.

(10) Patent No.: US 9,610,785 B2
(45) Date of Patent: Apr. 4, 2017

(54) TAPE PRINTER

(71) Applicant: Seiko Epson Corporation, Tokyo (JP)

(72) Inventors: Masahiro Oida, Suwa (JP); Takeshi Hosokawa, Suwa (JP); Yusuke Harigae, Suwa (JP); Noriaki Murayama, Suwa (JP); Junpei Watanabe, Chiyoda-ku (JP); Ayako Inoue, Chiyoda-ku (JP); Tomoko Yamada, Chiyoda (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/790,304

(22) Filed: Jul. 2, 2015

(65) Prior Publication Data

US 2016/0039226 A1    Feb. 11, 2016

(30) Foreign Application Priority Data

Aug. 5, 2014   (JP) ................. 2014-159230

(51) Int. Cl.
*B41J 3/407*      (2006.01)
*B41J 11/70*      (2006.01)
*G06K 15/02*      (2006.01)

(52) U.S. Cl.
CPC ............. *B41J 11/70* (2013.01); *B41J 3/4075* (2013.01); *B41J 11/703* (2013.01); *G03G 2215/00556* (2013.01); *G06K 15/022* (2013.01)

(58) Field of Classification Search
CPC ....... B41J 11/007; B41J 11/06; B41J 11/0085; B41J 13/103; B41J 11/0065; B41J 11/70; B41J 11/703; B41J 3/4075; G06K 15/022; G03G 2215/00556

USPC .................................................. 347/104, 101
See application file for complete search history.

(56) References Cited

U.S. PATENT DOCUMENTS

| | | | | |
|---|---|---|---|---|
| 5,854,647 A | * | 12/1998 | Ohtsuka | B41J 11/0065 347/101 |
| 2008/0231898 A1 | * | 9/2008 | Iwanaga | B41J 3/4075 358/1.15 |
| 2009/0319072 A1 | * | 12/2009 | Fukui | B41J 3/4075 700/110 |
| 2011/0292150 A1 | * | 12/2011 | Ishii | B41J 3/4075 347/110 |
| 2013/0278665 A1 | * | 10/2013 | Imamura | B41J 13/0009 347/16 |
| 2014/0140748 A1 | * | 5/2014 | Sasaki | B41J 33/52 400/231 |

FOREIGN PATENT DOCUMENTS

JP       2009-255334 A      11/2009

* cited by examiner

*Primary Examiner* — Manish S Shah
*Assistant Examiner* — Yaovi M Ameh
(74) *Attorney, Agent, or Firm* — ALG Intellectual Property, LLC

(57) ABSTRACT

Disclosed is a tape printer including a feed portion, a feed path, a print portion, and a cut portion. The feed portion performs pre-print feed to feed a tape before a print process and post-print feed to feed the tape after the print process. In addition, the feed portion feeds the tape forward as the post-print feed such that the upstream-side end of an image printed on the tape is positioned on the downstream side of a cut position and the tape backward as the pre-print feed when the cut portion has not performed a cut operation after the post-print feed at the time of starting the following print process.

5 Claims, 12 Drawing Sheets

FIG. 4A
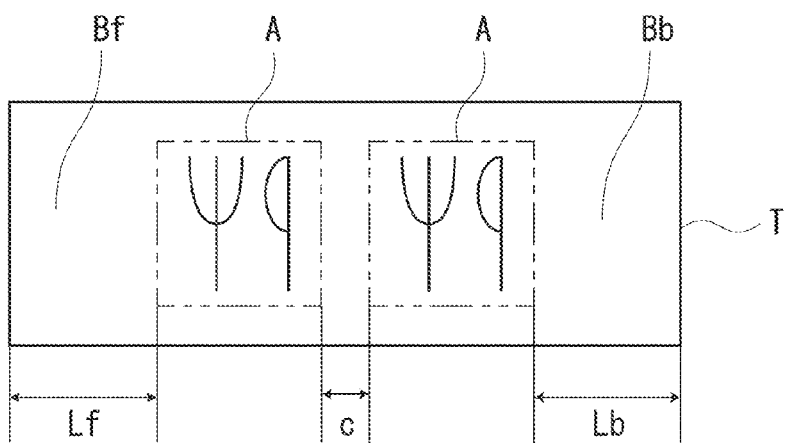
FIG. 4B
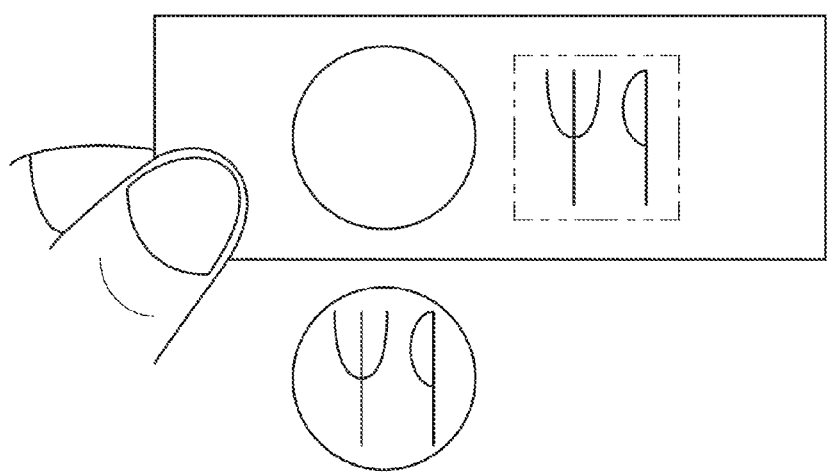
FIG. 4C

F I G. 9
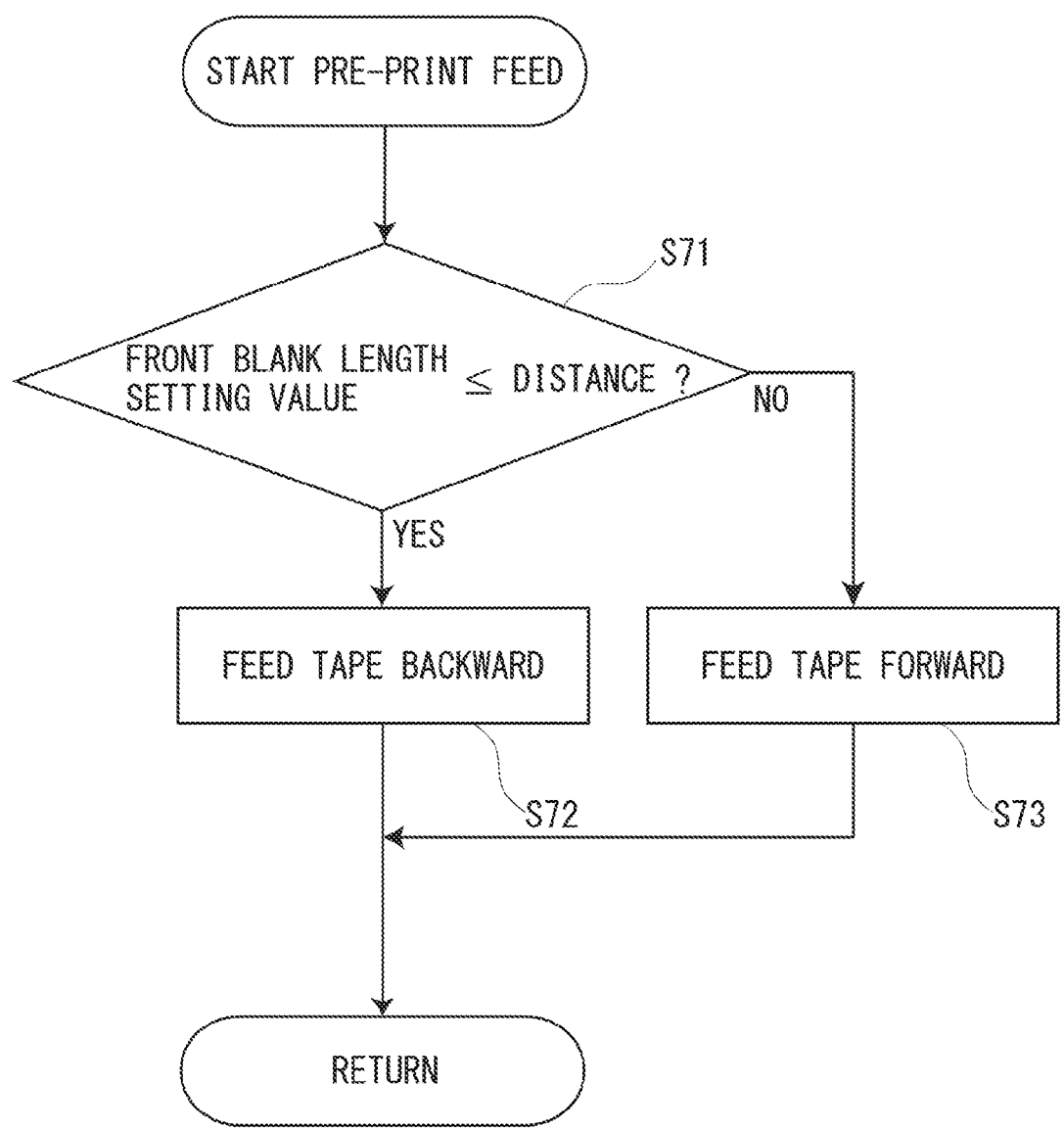

TAPE PRINTER

CROSS REFERENCE TO RELATED APPLICATION

The entire disclosure of Japanese Patent Application No. 2014-159230, filed Aug. 5, 2014 is expressly incorporated by reference herein.

BACKGROUND

1. Technical Field

The present invention relates to a tape printer capable of feeding a tape forward and backward.

2. Related Art

A known printer has a tape movement path along which a print tape is fed forward and backward, a print head that performs printing on the print tape, a cutter that is provided on the downstream side of the print head on the tape movement path and cuts off the print tape, and a platen roller capable of feeding the print tape forward and backward along the tape movement path. When such a printer directly performs the following print process on the tape, from which a printed part has been separated by the cutter, in succession to a previous print process, a blank is produced at the downstream-side end of the print tape by a distance equivalent to the distance between the print head and the cutter. Therefore, in order to narrow the blank at the downstream-side end of the print tape to a greater extent, the printer feeds the print tape backward by the distance equivalent to the distance between the print head and the cutter at the time of starting the print process (see JP-A-2009-255334).

Since a tape printer like the known printer separates a printed part of a tape after a print process, it performs post-print feed to feed the tape forward such that the upstream-side end of an image printed on the tape is positioned on the downstream side of a cut position. A forward feed amount of the tape in the post-print feed becomes greater than the distance between a print position and the cut position. However, for example, when a user wants to obtain a tape in which an image in the following print process is printed in succession to an image in a previous print process, the tape printer performs the following print process without performing a cut operation after post-print feed in succession to the previous print process. In this case, when the tape printer directly performs the following print process, an image distance is produced between the image in the previous print process and the image in the following print process by a distance (length) substantially equivalent to a forward feed amount of the tape in the post-print feed. If the produced image distance is great, the tape is wastefully consumed.

SUMMARY

An advantage of an aspect of the present invention is to provide a tape printer capable of printing images on a tape such that the image distance between an image in a previous print process and an image in the following print process becomes small.

According to an aspect of the present invention, there is provided a tape printer including: a feed portion that performs forward feed to feed a tape in a forward direction and backward feed to feed the tape in a backward direction; a feed path along which the tape is fed in the forward direction and the backward direction; a print portion that performs a print process of an image on the tape at a print position of the feed path; and a cut portion that performs a cut operation to cut off the tape at a cut position on a downstream side of the print position of the feed path. The feed portion performs pre-print feed to feed the tape before the print process and post-print feed to feed the tape after the print process. In addition, the feed portion feeds the tape forward as the post-print feed such that an upstream-side end of the image printed on the tape is positioned on a downstream side of the cut position and the tape backward as the pre-print feed when the cut portion has not performed the cut operation after the post-print feed at a time of starting a following print process.

According to this configuration, the tape printer feeds the tape backward as the pre-print feed when the cut portion has not performed the cut operation after the post-print feed in succession to a previous print process at the time of starting the print process. Thus, the image distance between an image in the previous print process and an image in the following print process becomes substantially equivalent to a value obtained by subtracting a backward feed amount of the tape in the pre-print feed from a forward feed amount of the tape in the post-print feed. Accordingly, the tape printer may print the images on the tape such that the image distance between the image in the previous print process and the image in the following print process becomes small.

In this case, the feed portion preferably feeds the tape backward as the pre-print feed by a distance greater than a distance between the print position and the cut position when the cut portion has not performed the cut operation after the post-print feed at the time of starting the print process.

According to this configuration, the tape printer feeds the tape forward as the post-print feed by at least the distance equivalent to the distance between the print position and the cut position. However, in the pre-print feed before the following print process, the tape printer feeds the tape backward by the distance greater than the distance between the print position and the cut position. Thus, the tape printer may print the images on the tape such that the image distance between the image in the previous print process and the image in the following print process becomes small to a greater extent.

In this case, the feed portion preferably feeds the tape backward as the pre-print feed by a distance not greater than the distance between the print position and the cut position when the cut portion has performed the cut operation after the post-print feed at the time of starting the print process.

If the tape printer feeds the tape backward by the distance greater than the distance between the print position and the cut position like a case in which the cut portion has not performed the cut operation when the cut portion has performed the cut operation after the post-print feed in succession to the previous print process at the time of starting the print process, the downstream-side end of the tape from which a printed part has been separated is fed to an upstream side across the print position.

According to the present configuration, the tape printer feeds the tape backward as the pre-print feed by the distance not greater than the distance between the print position and the cut position when the cut portion has performed the cut operation after the post-print feed in succession to the previous print process at the time of starting the print process. Therefore, the downstream-side end of the tape is not fed to the upstream side across the print position and gets closer to the side of the print position from the cut position. Thus, the tape printer may print the following image near the downstream-side end of the tape. Accordingly, the tape printer may print the images on the tape such that a blank at the downstream-side end of the tape becomes small.

In this case, the tape printer preferably further includes a detection portion that detects whether the cut portion has performed the cut operation. In addition, the feed portion preferably switches a backward feed amount of the tape between the distance greater than the distance between the print position and the cut position and the distance not greater than the distance between the print position and the cut position based on a detection result obtained by the detection portion.

According to this configuration, the tape printer feeds the tape backward as the post-print feed by the distance greater than the distance between the print position and the cut position when the detection portion has not detected the cut operation. On the other hand, the tape printer feeds the tape backward as the pre-print feed by the distance not greater than the distance between the print position and the cut position when the detection portion has detected the cut operation.

In this case, the tape printer preferably further includes a manual operation portion that causes the cut portion to perform the cut operation.

According to this configuration, the cut portion performs the cut operation when the manual operation portion is operated by a user, whereby the tape printer may cut off the tape.

In this case, the tape printer preferably further includes: a cutter drive portion that causes the cut portion to perform the cut operation; and a setting operation portion used to set whether the cut portion is caused to perform the cut operation. In addition, the feed portion preferably switches a backward feed amount of the tape between the distance greater than the distance between the print position and the cut position and the distance not greater than the distance between the print position and the cut position based on a setting result obtained by the setting operation portion.

According to this configuration, the tape printer feeds the tape backward by the distance greater than the distance between the print position and the cut position at the time of starting the print process when the setting operation portion is operated by the user so as not to perform the cut operation. In addition, the tape printer feeds the tape backward by the distance not greater than the distance between the print position and the cut position at the time of starting the print process when the setting operation portion is operated by the user so as to perform the cut operation.

BRIEF DESCRIPTION OF THE DRAWINGS

FIGS. 4A to 4C are diagrams for describing a tape obtained according to the icon print mode of the tape printer.

FIG. 9 is a flowchart of pre-print feed.

FIGS. 10A1 to 10G are diagrams for describing a state in which the tape printer performs a print process twice to print two images; FIGS. 10A1, 10B1, 10C1, 10D1, 10E1, and 10F1 are showing a case in which a cut operation has been performed between the two print processes; FIGS. 10A2, 10C2, 10D2, 10E2, 10F2, and 10G are showing a case in which the cut operation has not been performed between the two print processes.

DESCRIPTION OF EXEMPLARY EMBODIMENT

Hereinafter, a description will be given of a tape printer according an embodiment of the present invention with reference to the accompanying drawings.

Figure 1:
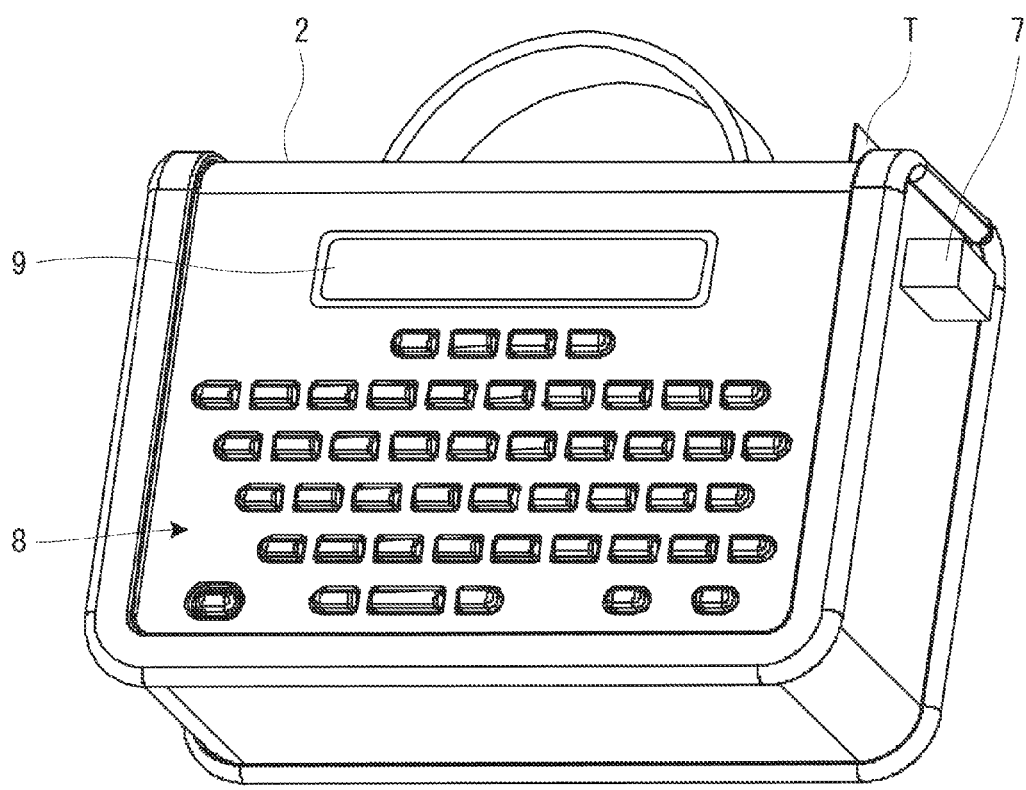
FIG. 1 is a perspective view of a tape printer according to an embodiment of the present invention when seen from its front side.
Figure 2:
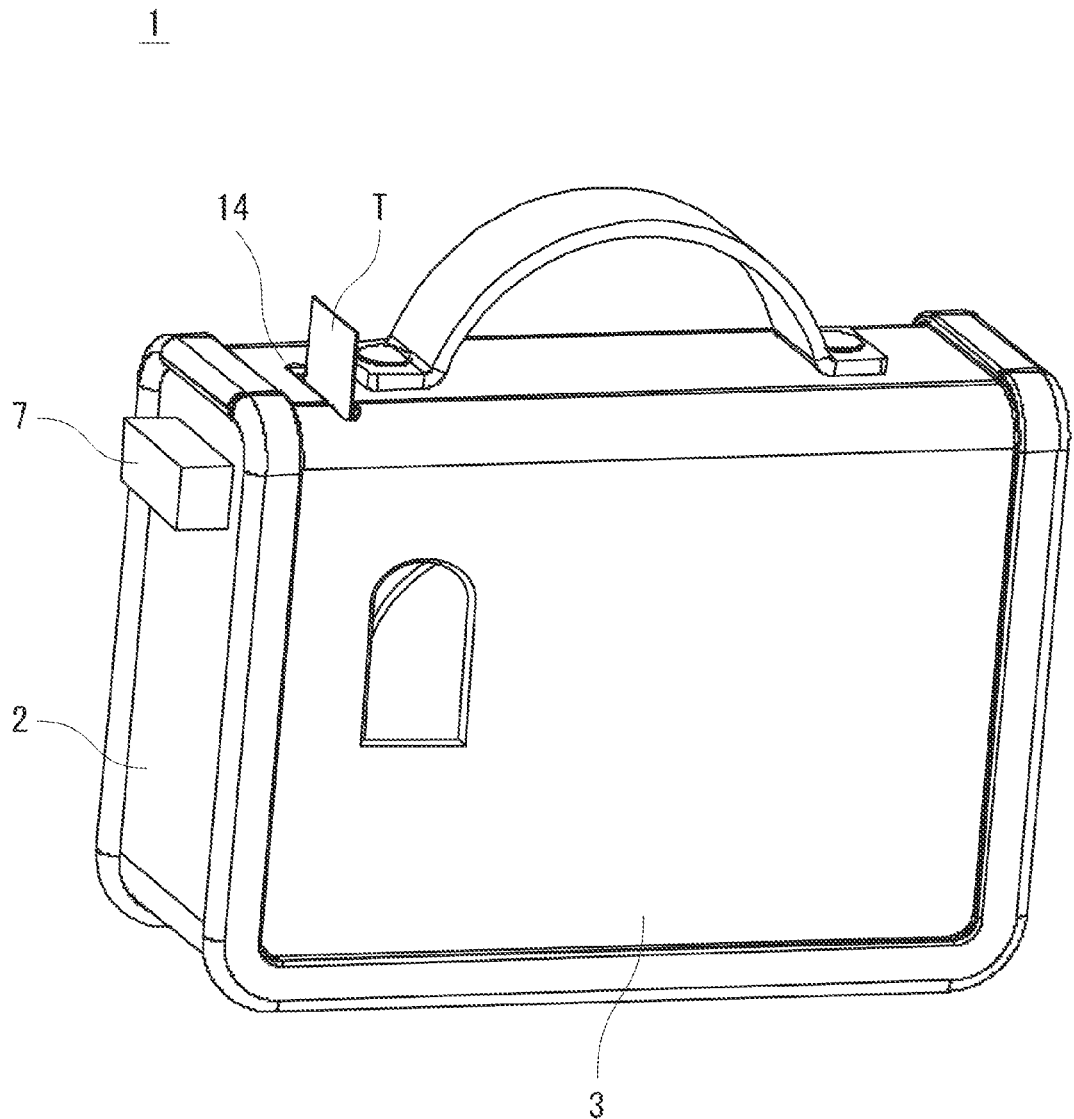
FIG. 2 is a perspective view of the tape printer when seen from its back side.
Figure 3:
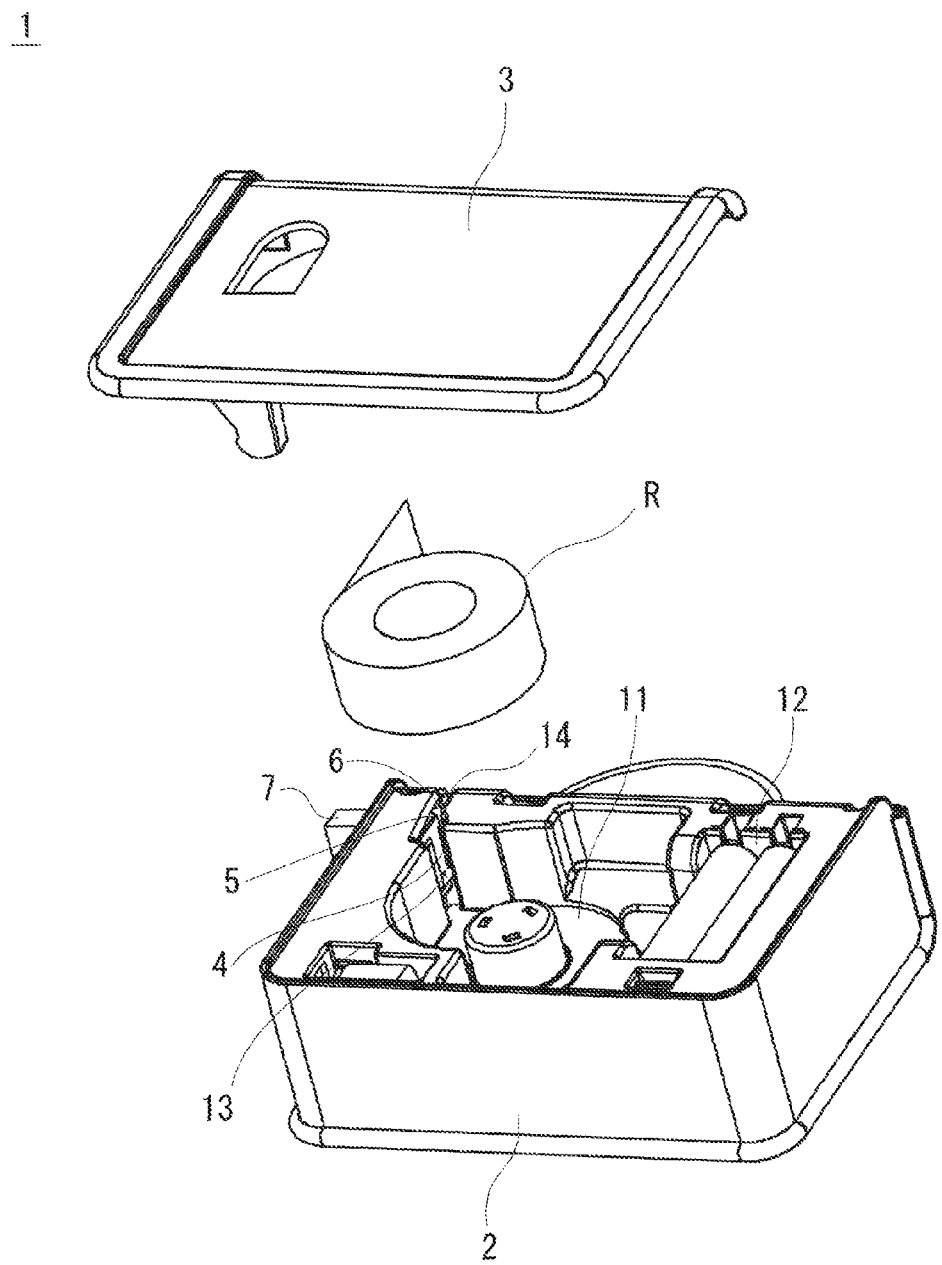
FIG. 3 is a perspective view of the tape printer with its cover body removed.

As shown in FIGS. 1 to 3, a tape printer 1 has a printer case 2, a cover body 3, a platen roller 4, a print head 5, a tape cutter 6, and a cutter button 7.

The printer case 2 forms the outer shell of the tape printer 1. The printer case 2 has a keyboard 8 and a display 9 on its front side. The keyboard 8 accepts an input operation from a user. The keyboard 8 has character keys to input characters and symbols, cursor keys to move a cursor and switch an alternative, a selection key to determine an alternative, a print key to perform printing, an icon key to set an icon print menu that will be described later, or the like. The display 9 displays a result or the like input with the keyboard 8. The user inputs characters, symbols, icons, or the like as desired print targets with the keyboard 8 while confirming an input result on the display 9. Note that the icons include, for example, a plurality of types of pictures or pictographs expressing various schedules or the like such as meetings, lunches, and business trips.

The printer case 2 has a roll installation portion 11, a battery accommodation portion 12, and a feed path 13 on its back side. In addition, the printer case 2 has a tape ejection port 14 on its lateral side.

In the roll installation portion 11, a small-wound tape roll R is installed. The tape roll R is constituted by a long tape T wound up in a roll shape so as to form a hole with a prescribed size at its axis. The tape T has a tape main body and a separation tape. The tape main body is constituted by a thermal paper. Note that an ink ribbon may be, of course, used to perform printing. The tape T is so-called a masking tape and includes a plurality of types in which the front surfaces of the tape main bodies are different in color and design. Note that the width of the tape T is not particularly limited but is about, for example, 15 mm.

The feed path 13 is provided between the roll installation portion 11 and the tape ejection port 14. The tape T fed out from the roll installation portion 11 is ejected from the tape ejection port 14 to the outside of the tape printer 1 via the feed path 13. In addition, the tape printer 1 is capable of feeding the tape T in a backward direction on the feed path 13. Note that a direction from the roll installation portion 11 to the tape ejection port 14 is called a forward direction and a direction from the tape ejection port 14 to the roll installation portion 11 is called the backward direction.

The cover body 3 is provided on the back side of the printer case 2. The cover body 3 covers the roll installation portion 11, the battery accommodation portion 12, and the feed path 13. The user opens/closes the cover body 3 at the installation of the tape roll R, the replacement of batteries, or the like.

The platen roller 4 rotates forward and backward with a feed motor 15 (see FIG. 5A) as a drive source. The platen roller 4 feeds the tape T held between the platen roller 4 and the print head 5 by rotation in the forward direction and the backward direction. That is, the platen roller 4 is capable of performing forward feed to feed the tape T in the forward direction along the feed path 13 and backward feed to feed the tape T in the backward direction along the feed path 13. Note that an "upstream" and a "downstream" in the following description will be based on the forward feed. When the print head 5 performs a print process, the platen roller 4 performs, besides print feed to feed the tape T forward, pre-print feed to feed the tape T before the print process, and post-print feed to feed the tape T after the print process, each of which will be described later.

The print head 5 performs the print process to print images A (see FIG. 4A) on the tape T. The print head 5 is provided so as to face the platen roller 4 across the feed path 13. The print head 5 is of a thermal type. The print head 5 is heated and driven to print the images A on the forwardly-fed tape T. The images A are expressed in the form of a bitmap font.

Note that the print head 5 is an example of a "print portion."

The tape cutter 6 is provided on the downstream side of the platen roller 4 and the print head 5. The tape cutter 6 performs a cut operation to cut off the tape T. The tape printer 1 has a cut sensor 16 (see FIG. 5A) to detect whether the tape cutter 6 has performed the cut operation. The cut sensor 16 is constituted by, for example, a micro switch. The cutter button 7 is used to cause the tape cutter 6 to perform the cut operation according to a manual operation.

Note that the tape cutter 6 is an example of a "cut portion." The cutter button 7 is an example of a "manual operation portion." The cut sensor 16 is an example of a "detection portion."

On the feed path 13, a position at which the print head 5 performs the print process is called a print position Pp and a position at which the tape cutter 6 performs the cut operation is called a cut position Pc (see FIG. 10A1 to 10G). The cut position Pc is provided on the downstream side of the print position Pp. In addition, a distance D between the print position Pp and the cut position Pc (hereinafter called the distance D) is, for example, about 10 mm. The value of the distance D is stored in the memory of the controller 20 that will be described later.

A description will be given, with reference to FIGS. 4A to 4C, of the tape T obtained according to the icon print menu, i.e., one of print menus provided in the tape printer 1. The icon print menu is a print menu to print the images A as icons one by one. The images A printed on the tape T are bored into, for example, a circular shape by a punch or the like (see FIG. 4B) and attached onto a notebook or the like (see FIG. 4C). Therefore, according to the icon print menu, the tape T is obtained that has a front blank Bf and a back blank Bb on the front and back sides of the images A as areas picked up with the fingers when the user bores the images A with a punch or the like (see FIG. 4A). The length of the front blank Bf is called a front blank length Lf, and the length of the back blank Bb is called a back blank length Lb.

Note that rectangular two-dot chain lines shown in FIG. 4A are imaginary lines expressing the outer shapes of the images A in the form of a bitmap font.

Figure 5A:
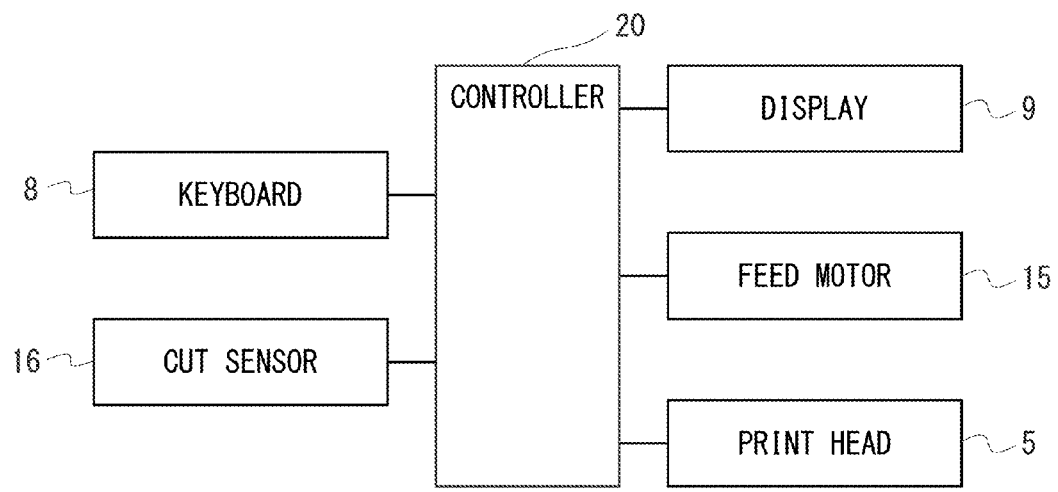
FIG. 5A is a diagram showing a hardware configuration example of the tape printer.

A description will be given of a hardware configuration example of the tape printer 1 with reference to FIG. 5A. The tape printer 1 has a controller 20, besides the print head 5, the keyboard 8, the display 9, the feed motor 15, and the cut sensor 16 described above.

The controller 20 is constituted by a CPU (Central Processing Unit), a ROM (Read Only Memory), a RAM (Random Access Memory), or the like not shown. The CPU of the controller 20 loads a program from the ROM and executes the same with the RAM to control the entire operation of the tape printer 1.

Figure 5B:
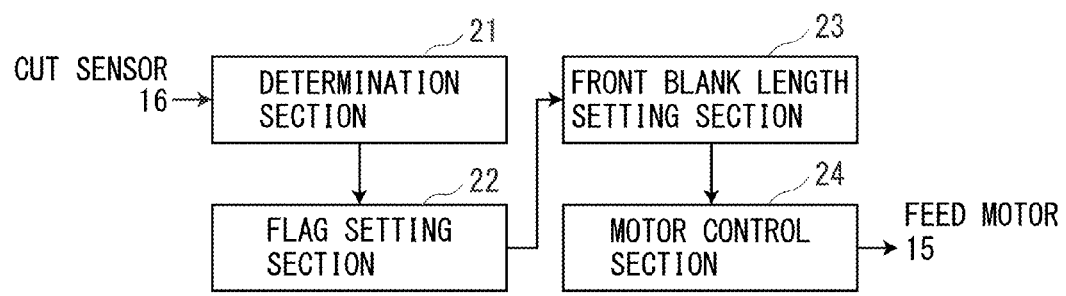
FIG. 5B is a diagram showing a function configuration example of the tape printer.

A description will be given of a function configuration example of the tape printer 1 with reference to FIG. 5B. At least some of function sections shown in FIG. 5B are implemented when the controller 20 shown in FIG. 5A performs a prescribed program.

The tape printer 1 has a determination section 21, a flag setting section 22, a front blank length setting section 23, and a motor control section 24. The determination section 21 determines whether the tape cutter 6 has performed the cut operation based on an output from the cut sensor 16. The flag setting section 22 puts a cut flag that indicates whether the tape cutter 6 has performed the cut operation in either an "uncut state (i.e., a state in which the tape cutter 6 has not performed the cut operation)" or a "cut state (i.e., a state in which the tape cutter 6 has performed the cut operation)" according to a determination result obtained by the determination section 21. The front blank length setting section 23 sets a front blank length setting value as a setting value of the front blank length Lf according to a state of the cut flag. The motor control section 24 performs the pre-print feed according to the front blank length setting value set by the front blank length setting section 23.

Figure 6:
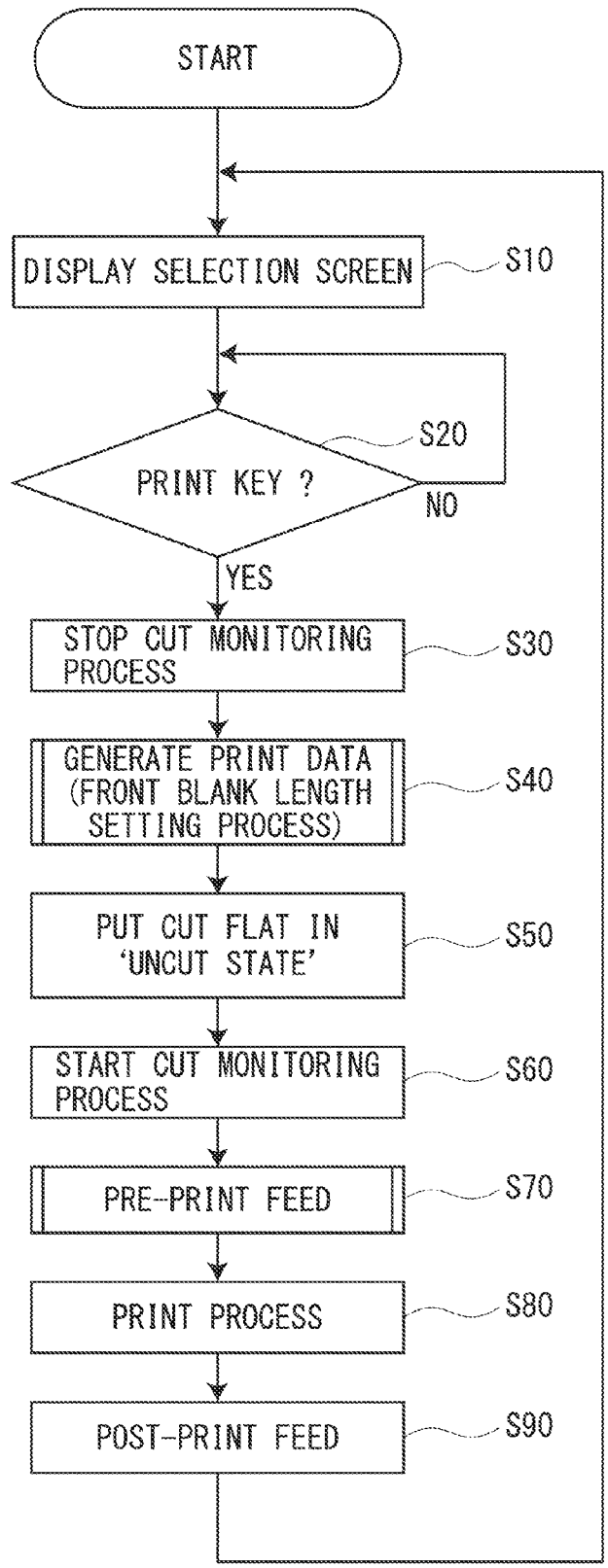
FIG. 6 is a flowchart showing a series of processes according to the icon print menu of the tape printer.

A description will be given, with reference to FIG. 6, of each step performed by the tape printer 1 according to the icon print menu.

The tape printer 1 starts the icon print menu when the user presses the icon key. The tape printer 1 first displays the icon selection screen on the display 9 (S10). Next, the tape printer 1 determines whether the user has pressed the print key (S20). When determining that the user has pressed the print key (S20; Yes), the tape printer 1 stops a cut monitoring process that will be described later (S30) and generates print data (S40). In step 40, the front blank length setting section 23 performs a front blank length setting process that will be described later. On the other hand, when determining that the user has not pressed the print key (S20; No), the tape printer 1 repeatedly performs the process of step 20.

After step 40, the flag setting section 22 puts the cut flag in the "uncut state" (S50). Then, the tape printer 1 starts the cut monitoring process (S60). Next, the tape printer 1 performs the pre-print feed (S70), the print process (S80), and the post-print feed (S90) in succession. In the post-print feed, the platen roller 4 feeds the tape T forward such that the upstream-side end of the image A printed on the tape T is positioned on the downstream side of the cut position Pc. A forward feed amount of the tape T in the post-print feed is equivalent to a value obtained by adding together the distance D and a back blank length setting value as a setting value of the back blank length Lb. After the post-print feed, the tape printer 1 returns to step 10 and displays the icon selection screen on the display 9. After this, the tape printer 1 repeatedly performs the processes of the above steps Next, a description will be given of the cut monitoring process. As described above, the tape printer 1 performs the cut monitoring process before the user presses the print key for the following print process (S20; Yes) after the flag setting section 22 has put the cut flag in the "uncut state" (S50).

Figure 7:
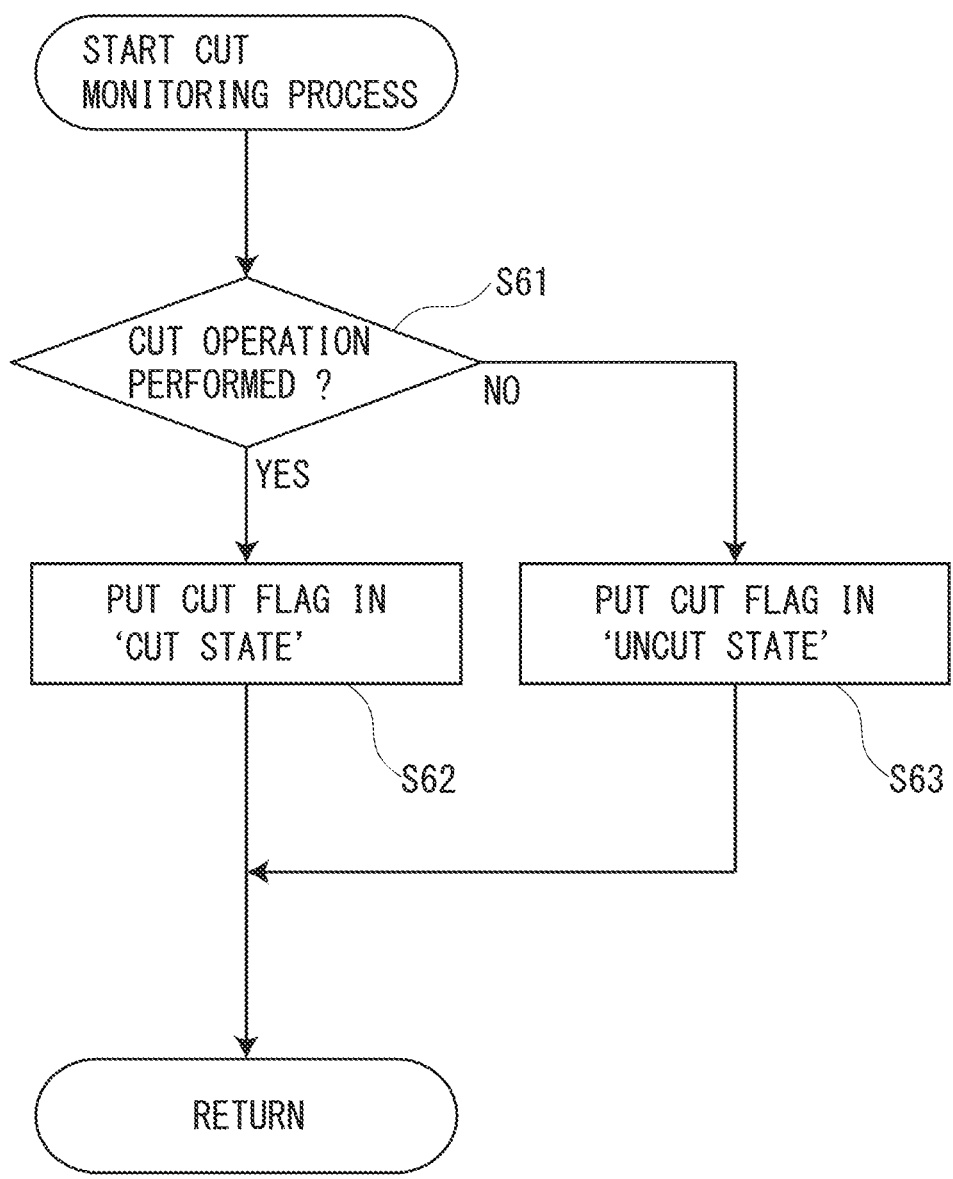
FIG. 7 is a flowchart of a cut monitoring process.

As shown in FIG. 7, when the tape printer 1 starts the cut monitoring process, the determination section 21 first determines whether the tape cutter 6 has performed the cut operation based on an output from the cut sensor 16 (S61). When the determination section 21 determines that the tape cutter 6 has performed the cut operation (S61; Yes), the flag setting section 22 puts the cut flag in the "cut state" (S62). On the other hand, when the determination section 21 determines that the tape cutter 6 has not performed the cut operation (S61; No), the flag setting section 22 makes the cut flag remain in the "uncut state" (S63). The tape printer 1 repeatedly performs the processes from step 61 to step 62 or step 63 before the user presses the print key.

Next, a description will be given of the front blank length setting process.

Figure 8:
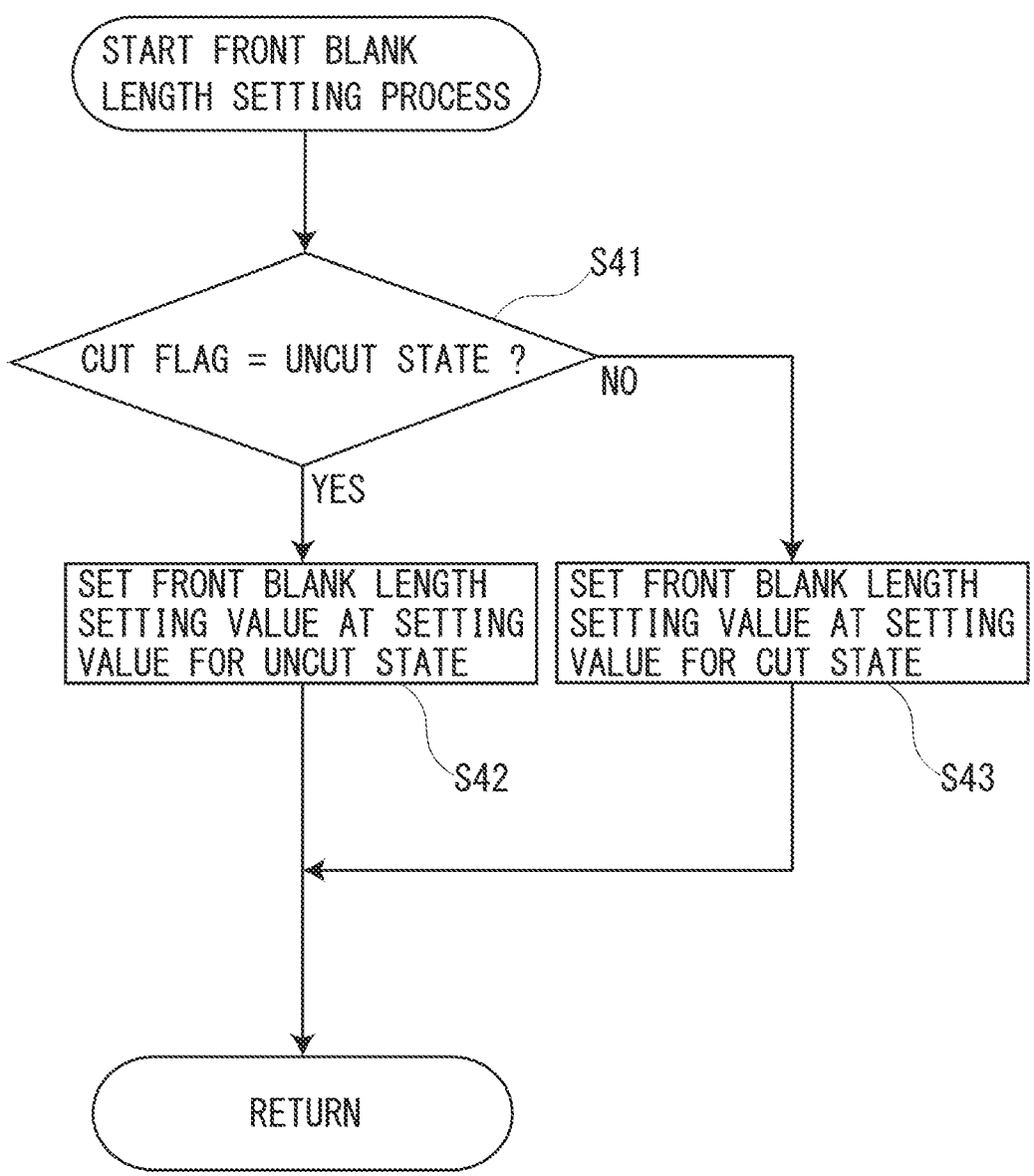
FIG. 8 is a flowchart of a front blank length setting process.

As shown in FIG. 8, the front blank length setting section 23 determines whether the cut flag has been put in the "uncut state" (S41). When the cut flag has been put in the "uncut state" (S41; Yes), the front blank length setting section 23 sets the front blank length setting value at a prescribed setting value for the uncut state (S42). On the other hand, when the cut flag has been put in the "cut state" (S41; No), the front blank length setting section 23 sets the front blank length setting value at a prescribed setting value for the cut state (S43). Here, the setting value for the uncut state is any negative number. The setting value for the cut state is any positive number smaller in number than the distance D. Note that the setting value for the cut state is preferably set at a value of a substantial length at which the front blank Bf is picked up with the fingers. The same applies to the back blank length setting value described above.

Next, a description will be given of the pre-print feed.

As shown in FIG. 9, the motor control section 24 determines whether the front blank length setting value is less than or equal to the distance D (S71). When determining that the front blank length setting value is less than or equal to the distance D (S71; Yes), the motor control section 24 drives the feed motor 15 to feed the tape T backward (S72). A backward feed amount in the pre-print feed is equivalent to a value obtained by subtracting the front blank length setting value from the distance D. On the other hand, when determining that the front blank length setting value is greater than the distance D (S71; No), the motor control section 24 drives the feed motor 15 to feed the tape T forward (S73). A forward feed amount in the pre-print feed is equivalent to a value obtained by subtracting the distance D from the front blank length setting value.

A description will be given, with reference to FIGS. 6 to 9 and by the use of FIGS. 10A1 to 10G, of a case in which the tape printer 1 performs the print process twice according to the icon print menu to print the two images A. Here, a description will be separately given of a case in which the tape cutter 6 has performed the cut operation after the first post-print feed and a case in which the tape cutter 6 has not performed the cut operation after the first post-print feed when the tape printer 1 starts the second print process.

First, a description will be given of the case in which the tape cutter 6 has performed the cut operation.

FIG. 10A1 shows a state in which the tape printer 1 has performed the post-print feed (S90) after the first print process (S80). In this state, the upstream-side end of the image A in the first print process is positioned on the downstream side of the cut position Pc.

When the user operates the cutter button 7 before pressing the print key for the second print process (S20; Yes) after the post-print feed (S90), the tape cutter 6 performs the cut operation. As a result, as shown in FIG. 10B1, the tape T is obtained that has the front blank Bf and the back blank Bb on the front and back sides of the image A in the first print process. At this time, the determination section 21 determines in the cut monitoring process that the tape cutter 6 has performed the cut operation (S61; Yes), and the flag setting section 22 puts the cut flag in the "cut state" (S62).

Next, when the user selects the icon to be printed in the second print process and presses the print key (S20; Yes), the tape printer 1 stops the cut monitoring process (S30) and generates print data (S40). Since the cut flag has been put in the "cut state" (S41; No) in the generation process of the print data, the front blank length setting section 23 sets the front blank length setting value at the setting value for the cut state (S43).

After the completion of the print data, the flag setting section 22 puts the cut flag in the "uncut state" (S50). Then, the tape printer 1 starts the cut monitoring process (S60).

Next, the tape printer 1 performs the pre-print feed (S70). Here, since the front blank length setting value has been set at the setting value for the cut state smaller than the distance D (71; Yes), the platen roller 4 rotates the tape T backward (S72) as shown in FIG. 10C1. The backward feed amount is equivalent to a value obtained by subtracting the setting value for the cut state from the distance D. Accordingly, when the cut sensor 16 detects the cut operation of the tape cutter 6, the tape printer 1 feeds the tape T backward as the pre-print feed by the distance not greater than the distance D.

Then, as shown in FIG. 10D1, the tape printer 1 performs the second print process (S80) to print the selected image A on the tape T. Next, as shown in FIG. 10E1, the tape printer 1 performs the post-print feed (S90).

After that, when the user operates the cutter button 7, the tape cutter 6 performs the cut operation. As a result, as shown in FIG. 10F1, the tape T is obtained that has the front blank Bf and the back blank Bb on the front and back sides of the image A in the second print process.

Next, a description will be given of the case in which the tape cutter 6 has not performed the cut operation.

As described above, in the state in which the tape printer 1 has performed the post-print feed after the first print process, the upstream-side end of the image A in the first print process is positioned on the downstream side of the cut position Pc (see FIG. 10A2). When the user does not operate the cutter button 7 before pressing the print key for the second print process (S20; Yes) after the post-print feed, the determination section 21 determines in the cut monitoring process that the tape cutter 6 has not performed the cut operation (S61; No). In this case, the flag setting section 22 makes the cut flag remain in the "uncut state" (S63).

Next, when the user selects the icon to be printed in the second print process and presses the print key (S20; Yes), the tape printer 1 stops the cut monitoring process (S30) and generates print data (S40). Since the cut flag has been put in the "uncut state" (S41; Yes) in the generation process of the print data, the front blank length setting section 23 sets the front blank length setting value at the setting value for the uncut state (S42).

After the completion of the print data, the flag setting section 22 puts the cut flag in the "uncut state" (S50). Then, the tape printer 1 starts the cut monitoring process (S60).

Next, the tape printer 1 performs the pre-print feed (S70). Here, since the front blank length setting value has been set at the setting value for the uncut state smaller than the distance D (71; Yes), the platen roller 4 rotates the tape T backward (S72) as shown in FIG. 10C2. Thus, the upstream-side end of the image A in the previous print process gets closer to the side of the print position Pp from a position on the downstream side of the cut position Pc. The backward feed amount is equivalent to a value obtained by subtracting the setting value for the uncut state from the distance D, i.e., a value obtained by adding together the distance D and the absolute value of the setting value for the uncut state. Accordingly, when the cut sensor 16 does not detect the cut operation of the tape cutter 6, the tape printer 1 feeds the tape T backward as the pre-print feed by the distance greater than the distance D.

Then, as shown in FIG. 10D2, the tape printer 1 performs the second print process (S80) to print the selected image A on the tape T. Next, as shown in FIG. 10E2, the tape printer 1 performs the post-print feed (S90).

After that, when the user operates the cutter button 7, the tape cutter 6 performs the cut operation. As a result, as shown in FIG. 10F2, the tape T is obtained that has the front blank Bf and the back blank Bb on the front and back sides of the image A in the first print process and the image A in the second print process.

Here, unlike the embodiment, when the tape printer 1 directly performs the second print process without feeding the tape T backward in the pre-print feed before the second print process, the tape T shown in FIG. 10G is obtained. In this case, an image distance C between the image A in the first print process and the image A in the second print process becomes a distance substantially equivalent to the forward feed amount of the tape T in the post-print feed. As described above, the forward feed amount is equivalent to the value obtained by adding together the distance D and the back blank length setting value. Therefore, the image distance C becomes greater than the back blank length Lb in this case. On the other hand, the image distance C between the image A in the first print process and the image A in the second print process is only required to be a distance at which the images A are bored by a punch and does not require a length such as the back blank length Lb. Therefore, the image distance C between the image A in the first print process and the image A in the second print process becomes greater than necessary, which results in the wasteful consumption of the tape T.

On the contrary, in the embodiment, the platen roller 4 feeds the tape T backward in the pre-print feed before the second print process. Therefore, the image distance C between the image A in the first print process and the image A in the second print process becomes substantially equivalent to a value obtained by subtracting the backward feed amount of the tape T in the pre-print feed from the forward feed amount of the tape T in the post-print feed.

As described above, when the tape cutter 6 has not performed the cut operation after the post-print feed in succession to the previous print process, the tape printer 1 of the embodiment feeds the tape T backward at the time of starting the print process. Therefore, the image distance C between the image A in the previous print process and the image A in the following print process becomes substantially equivalent to the value obtained by subtracting the backward feed amount of the tape T in the pre-print feed from the forward feed amount of the tape T in the post-print feed. Accordingly, the tape printer 1 may print the images A on the tape T such that the image distance C between the image A in the previous print process and the image A in the following print process becomes small, whereby the wasteful consumption of the tape T may be avoided.

The tape printer 1 of the embodiment feeds the tape T forward by a distance greater than the distance D in the post-print feed but feeds the tape T backward by the distance greater than the distance D in the pre-print feed before the following print process. That is, the tape printer 1 feeds the tape T backward by a distance equivalent to the value obtained by adding together the distance D and the absolute value of the setting value for the uncut state. Thus, the tape printer 1 may print the images A on the tape T such that the distance C between the image A in the previous print process and the image A in the following print process becomes small to a greater extent.

When the tape cutter 6 has performed the cut operation after the post-print feed in succession to the previous print process, the tape printer 1 of the embodiment feeds the tape T backward as the pre-print feed by the distance not greater than the distance D at the time of starting the print process. Therefore, the downstream-side end of the tape T is not fed to the upstream side of the print position Pp and gets closer from the cut position Pc to the print position Pp. Accordingly, the downstream-side end of the tape T may be prevented from being deviated from between the platen roller 4 and the print head 5. Further, the tape printer 1 may print the following image A near the downstream-side end of the tape T. Accordingly, the tape printer 1 may print the images A on the tape T such that the front blank Bf of the tape T becomes small.

It is needless to say that the present invention is not limited to the embodiment described above and various configurations may be employed without departing from the scope of the present invention. For example, the embodiment may be modified as follows.

The present invention is not limited to the icon print menu but may be applied to various print menus including normal text print menus. Therefore, the images A printed on the tape T are not limited to icons but may include normal characters, symbols, or the like. In addition, the number of the images A printed in a single print process may be greater than or equal to two.

The backward feed amount of the tape T in the pre-print feed may be smaller than the distance D or greater than the forward feed amount (obtained by adding together the distance D and the back blank length setting value) of the tape T in the post-print feed. In the latter case, the image A in the previous print process and the image A in the following print process overlap each other. That is, a state in which the image distance C between the image A in the previous print process and the image A in the following print process becomes small represents a concept including a case in which both the images A overlap each other.

A description will be given in further detail of the modifications with reference to FIGS. 11A and 11B and FIGS. 12A and 12B.

Figure 11A:
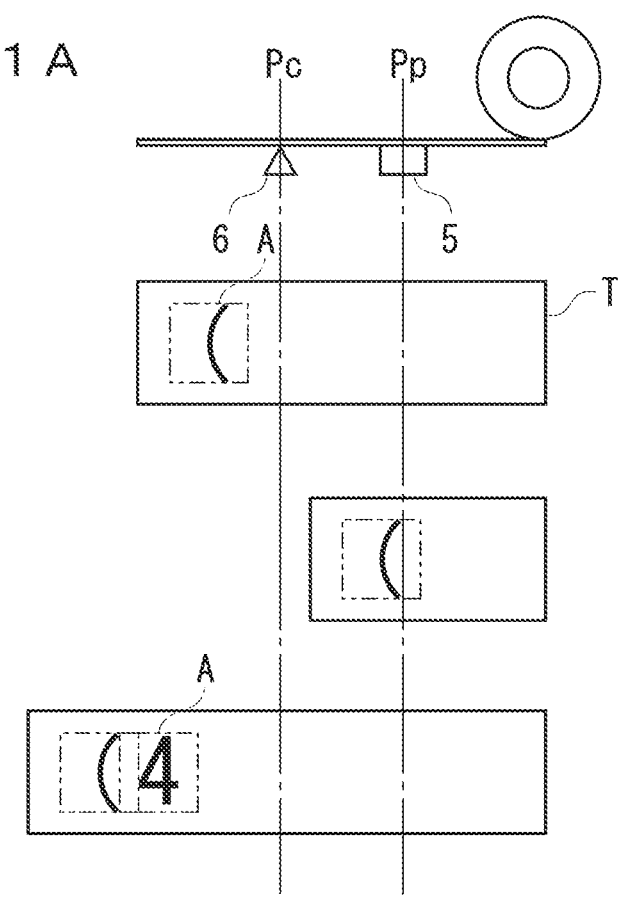
FIG. 11A is a diagram showing a case in which the pre-print feed has been performed such that a backward feed amount becomes greater than a forward feed amount after post-print feed in succession to the first print process to perform the second print process.
Figure 11B:
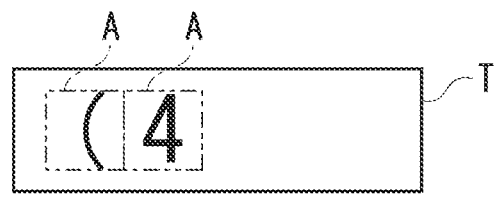
FIG. 11B is a diagram showing a case in which two images are printed in a single print process.

FIG. 11A shows a state in which the tape printer 1 prints "(" as the image A in the first print process, performs the pre-print feed such that the backward feed amount becomes greater than the forward feed amount after having performed the post-print feed, and prints "4" as the image A in the second print process. Thus, "(" as the image A and "4" as the image A are printed in their overlapping state. Accordingly, compared with a character string (see FIG. 11B) obtained when the tape printer 1 prints "(4" in a single print process, the tape printer 1 may obtain a character string in which the distance between the characters is narrowed and reduce the entire length of the character string.

Figure 12A:
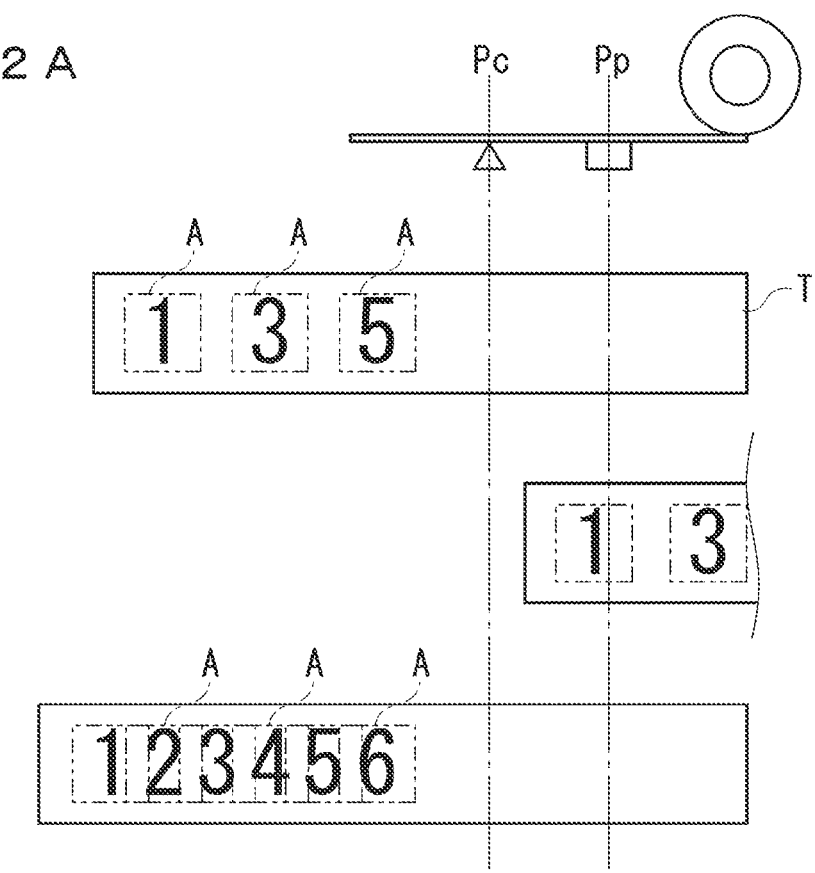
FIG. 12A is a diagram showing a case in which the pre-print feed has been performed such that a backward feed amount becomes greater than a forward feed amount after post-print feed in succession to the first print process to perform the second print process.
Figure 12B:
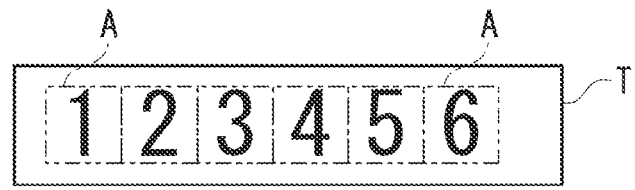
FIG. 12B is a diagram showing a case in which a plurality of images is printed in a single print process.

FIGS. 12A and 12B shows a state in which the tape printer 1 prints the odd-number images A when counted from the downstream side at a short pitch in the first print process, performs the pre-print feed such that the backward feed amount becomes greater than the forward feed amount after having performed the post-print feed, and prints the even-number images A in the second print process. Thus, the adjacent images A are printed in their overlapping state. In this case as well, compared with a character string (see FIG. 12B) obtained when the tape printer 1 prints "123456" in a single print process, the tape printer 1 may obtain a character string in which the distances between the characters are narrowed and reduce the entire length of the character string. In addition, compared with a case in which the tape printer 1 sequentially prints the images A from the first one, the tape printer 1 separately prints the odd-number images A and the even-number images A, whereby the tape printer 1 is not required to repeatedly perform the forward feed and the backward feed of the tape T.

Moreover, the tape printer 1 may have a cutter drive portion such as a motor that causes the tape cutter 6 to perform the cut operation, and the user may operate the keyboard 8 to set whether the tape cutter 6 is caused to perform the cut operation. In this case, the front blank length setting value may be set based on a detection result obtained by the cut sensor 16 as described above or may be set based on whether the cut sensor 16 is caused to perform the cut operation.

When the tape cutter 6 has performed the cut operation after the post-print feed in succession to the previous print process at the time of starting the print process, the tape printer 1 may start the print process without feeding the tape T backward as the pre-print feed.

In this case as well, the tape printer 1 performs the cut operation in the middle of the print process to cut off the downstream side of the image A, whereby the tape printer 1 may print the image on the tape T such that the front blank Bf of the tape T becomes small.

What is claimed is:

1. A tape printer comprising:
   a feed portion that performs forward feed to feed a tape in a forward direction and backward feed to feed the tape in a backward direction;
   a feed path along which the tape is fed in the forward direction and the backward direction;
   a print portion that performs a print process of an image on the tape at a print position of the feed path; and
   a cut portion that performs a cut operation to cut off the tape at a cut position on a downstream side of the print position of the feed path, wherein
   the feed portion performs
      pre-print feed to feed the tape before the print process and
      post-print feed to feed the tape after the print process, and the feed portion feeds
      the tape forward as the post-print feed such that an upstream-side end of the image printed on the tape is positioned on a downstream side of the cut position and
      the tape backward as the pre-print feed when the cut portion has not performed the cut operation after the post-print feed at a time of starting a following print process, wherein
   the feed portion feeds the tape backward as the pre-print feed by a distance greater than a distance between the print position and the cut position when the cut portion has not performed the cut o oration the post-print feed at the time of starting the print process.

2. The tape printer according to claim 1, further comprising:
   a manual operation portion that causes the cut portion to perform the cut operation.

3. The tape printer according to claim 1, wherein the feed portion feeds the tape backward as the pre-print feed by a distance not greater than the distance between the print position and the cut position when the cut portion has performed the cut operation after the post-print feed at the time of starting the print process.

4. The tape printer according to claim 3, further comprising:
   a detection portion that detects whether the cut portion has performed the cut operation, wherein
   the feed portion switches a backward feed amount of the tape between the distance greater than the distance between the print position and the cut position and the distance not greater than the distance between the print position and the cut position based on a detection result obtained by the detection portion.

5. The tape printer according to claim 3, further comprising:
   a cutter drive portion that causes the cut portion to perform the cut operation; and
   a setting operation portion used to set whether the cut portion is caused to perform the cut operation, wherein
   the feed portion switches a backward feed amount of the tape between the distance greater than the distance between the print position and the cut position and the distance not greater than the distance between the print position and the cut position based on a setting result obtained by the setting operation portion.

* * * * *